(12) United States Patent
Georges et al.

(10) Patent No.: US 9,846,264 B2
(45) Date of Patent: Dec. 19, 2017

(54) SUBSTRATE PROVIDED WITH A STACK HAVING THERMAL PROPERTIES

(71) Applicant: SAINT-GOBAIN GLASS FRANCE, Courbevoie (FR)

(72) Inventors: Benoît Georges, Palaiseau (FR); Stéphane Laurent, Clichy (FR); Jean-Carlos Lorenzzi, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/787,920

(22) PCT Filed: Apr. 28, 2014

(86) PCT No.: PCT/FR2014/051013
§ 371 (c)(1),
(2) Date: Oct. 29, 2015

(87) PCT Pub. No.: WO2014/177798
PCT Pub. Date: Nov. 6, 2014

(65) Prior Publication Data
US 2016/0124119 A1 May 5, 2016

(30) Foreign Application Priority Data

Apr. 30, 2013 (FR) ..................... 13 53972

(51) Int. Cl.
*G02B 1/116* (2015.01)
*C03C 17/36* (2006.01)
*G02B 5/28* (2006.01)

(52) U.S. Cl.
CPC .............. *G02B 1/116* (2013.01); *C03C 17/36* (2013.01); *C03C 17/366* (2013.01);
(Continued)

(58) Field of Classification Search
CPC ........... G02B 1/11; G02B 1/113; G02B 1/115; G02B 1/116; G02B 5/28; G02B 5/281;
(Continued)

(56) References Cited

U.S. PATENT DOCUMENTS 5,595,825 A    1/1997  Guiselin
2002/0086164 A1*  7/2002  Anzaki ............ B32B 17/10174
                                                                428/432
(Continued)

FOREIGN PATENT DOCUMENTS

EP           0 645 352 A1    3/1995
WO      WO 2012/140098 A1   10/2012

OTHER PUBLICATIONS

International Search Report as issued in International Patent Application No. PCT/FR2014/051013, dated Aug. 5, 2014.

*Primary Examiner* — Kimberly N Kakalec
(74) *Attorney, Agent, or Firm* — Pillsbury Winthrop Shaw Pittman LLP (57) ABSTRACT

A transparent substrate includes a stack of thin layers successively including, starting from the substrate, an alternation of three metallic functional layers, in particular of functional layers based on silver or on silver-comprising metal alloy, and of four antireflective coatings, each antireflective coating including at least one dielectric layer, so that each metallic functional layer is positioned between two antireflective coatings, wherein: the thicknesses of the metallic functional layers, starting from the substrate, increase as a function of the distance from the substrate, the second metallic functional layer is directly in contact with a blocking layer, referred to as second blocking layer, chosen from a blocking underlayer and a blocking overlayer, respectively referred to as second blocking underlayer and second blocking overlayer, the second blocking underlayer
(Continued)

and/or the second blocking overlayer exhibits a thickness of greater than 1 nm.

19 Claims, 3 Drawing Sheets

(52) U.S. Cl.
CPC ...... *C03C 17/3613* (2013.01); *C03C 17/3618* (2013.01); *C03C 17/3626* (2013.01); *C03C 17/3639* (2013.01); *C03C 17/3644* (2013.01); *C03C 17/3652* (2013.01); *C03C 17/3681* (2013.01); *G02B 5/282* (2013.01)

(58) Field of Classification Search
CPC .... G02B 5/282; G02B 5/285; C03C 17/3607; C03C 17/3613; C03C 17/3615; C03C 17/3618; C03C 17/3639; C03C 17/3642; C03C 17/3644; C03C 17/3657; C03C 17/366

USPC ................ 359/350–361, 577–596, 601–614, 359/885–892
See application file for complete search history.

(56) References Cited

U.S. PATENT DOCUMENTS

| | | | |
|---|---|---|---|
| 2004/0009356 A1* | 1/2004 | Medwick | C03C 17/36 428/432 |
| 2006/0257670 A1 | 11/2006 | Brochot et al. | |
| 2007/0081228 A1 | 4/2007 | Hartig | |
| 2007/0082206 A1* | 4/2007 | Hartig | C03C 17/36 428/432 |
| 2007/0116967 A1 | 5/2007 | Medwick et al. | |
| 2007/0204949 A1 | 9/2007 | Labrousse et al. | |
| 2009/0047466 A1* | 2/2009 | German | C03C 17/36 428/98 |
| 2009/0136765 A1* | 5/2009 | Maschwitz | B32B 17/10036 428/432 |
| 2009/0297864 A1* | 12/2009 | Lingle | C03C 17/36 428/432 |
| 2012/0177900 A1 | 7/2012 | Laurent et al. | |
| 2012/0219821 A1 | 8/2012 | Frank et al. | |

* cited by examiner

SUBSTRATE PROVIDED WITH A STACK HAVING THERMAL PROPERTIES

CROSS-REFERENCE TO RELATED APPLICATIONS

This application is the U.S. National Stage of PCT/FR2014/051013, filed Apr. 28, 2014, which in turn claims priority to French patent application number 1353972 filed Apr. 30, 2013. The content of these applications are incorporated herein by reference in their entireties.

The invention relates to a transparent substrate coated with a stack of thin layers comprising several functional layers which can influence solar radiation and/or high wavelength infrared radiation. The invention also relates to the glazings comprising these substrates and to the use of such substrates to manufacture thermal insulation and/or solar protection glazings.

These glazings may be intended to equip both buildings and vehicles, for the purpose in particular of reducing the air-conditioning strain and/or to prevent excessive overheating, which glazings are referred to as "solar control" glazings, and/or to reduce the amount of energy dissipated towards the outside, which glazings are referred to as "low-e" glazings, driven by the ever increasing importance of glazed surfaces in buildings and vehicle compartments.

Glazings comprising transparent substrates coated with a stack of thin layers comprising at least three metallic functional layers are known. These stacks are generally obtained by a sequence of depositions carried out by a technique which uses vacuum, such as cathode sputtering, optionally assisted by magnetic field.

The use of a substrate based on a stack comprising at least three metallic layers makes it possible to optimize the solar protection of the glazings incorporating them, which may be reflected by a decrease in the solar factor (g) and an increase in the selectivity (s). According to the invention:

solar factor (g) is understood to mean the ratio of the total energy entering the premises through the glazing to the incident solar energy, selectivity (s) is understood to mean the ratio of the light transmittance to the solar factor LT/g.

In this type of stack, each functional layer is positioned between two antireflective coatings each generally comprising several antireflective or dielectric layers which are each made of a material of the nitride and in particular silicon or aluminum nitride type and/or the oxide type. From the optical viewpoint, the aim of these coatings which frame the functional layer is to render this functional layer "antireflective".

The choice of the use of a stack comprising three metallic layers influences the light transmittance of the substrates and/or of the glazings incorporating said stacks. Depending on the climates of the countries where these glazings have to be incorporated, the performance in terms of light transmittance and of solar factor which has to be obtained can vary within a certain range. The light transmittance must be sufficiently low to eliminate dazzle and sufficiently high for the decrease in the amount of light penetrating inside the space delimited by said glazing not to make it necessary to use artificial light. For example, insulating glazings exhibiting a high selectivity of approximately 2 are advantageously used as glazings intended to experience high exposures to sunlight.

However, substrates or glazings comprising stacks having three metallic functional layers and a light transmittance of the order of 50% are not entirely satisfactory and exhibit in particular the following disadvantages:

a relatively unsatisfactory esthetic appearance with in particular unattractive colors in internal reflection, in external reflection and in transmittance, and/or high levels of reflection which are a nuisance to the observer, in particular when the substrate is used to delimit two spaces in which the levels of illumination are different, such as a room illuminated during the night, and/or relatively unsatisfactory solar control performances, such as a low selectivity.

A high external but in particular internal reflection exhibits the disadvantage, when the substrates are used as glazing for a building window, of returning obvious reflections, in the manner of mirrors, reducing visibility through the glazing.

A compromise thus has to be found between the optical and thermal performances, the transparency and the esthetic appearance.

For countries having hot climates, where the energy consumption in air-conditioning is predominant, g has to be low. According to the invention, the aim is thus to minimize the solar factor and to increase the selectivity, while retaining a light transmittance suitable for allowing good insulation and good viewing.

Patent application EP 0 645 352 discloses, for example, a transparent substrate comprising a stack of thin layers comprising in particular at least three layers of silver separated by layers of dielectric materials.

The thicknesses of the silver layers increase as a function of the distance from the substrate. The glazings comprising these substrates, although exhibiting a pleasant esthetic appearance, do not exhibit a selectivity of greater than 2. In point of fact, it is extremely difficult to retain both a good selectivity and esthetically acceptable colors in transmittance and in reflection with in particular an appearance of the glazing seen from the inside of neutral color.

The aim of the invention is thus to overcome these disadvantages by developing a substrate comprising a stack comprising at least three layers having reflection properties in the infrared region, in particular metallic layers, and which exhibits a high selectivity, that is to say an LT/g ratio which is as high as possible for a given LT value, while guaranteeing an appearance, in particular in external reflection, in internal reflection and in transmittance, which is pleasant to the eye, this being the case whether the substrate is used as monolithic glazing, incorporated in a multiple insulating glazing of the double glazing type, or even in a laminated glazing. These properties are preferably obtained after one (or more) heat treatment(s) at high temperature of the bending and/or tempering and/or annealing type. The pleasant to the eye appearance is reflected by colors in reflection, both from the outside and from the inside, being obtained which are more neutral, in the blue-green range, and which in addition vary little according to the angle of observation.

The subject matter of the invention is a transparent substrate 10 comprising a stack of thin layers as claimed in claim 1. It successively comprises, starting from the substrate, an alternation of three metallic functional layers 40, 80, 120, in particular of functional layers based on silver or on silver-comprising metal alloy, and of four antireflective coatings 20, 60, 100, 140, each antireflective coating comprising at least one dielectric layer, so that each metallic functional layer 40, 80, 120 is positioned between two antireflective coatings 20, 60, 100, 140. The thicknesses of the metallic functional layers 40, 80, 120, starting from the substrate, increase as a function of the distance from the substrate. The second metallic functional layer 80 is directly in contact with a blocking layer, referred to as second blocking layer, chosen from a blocking underlayer and a blocking overlayer, respectively referred to as second blocking underlayer and second blocking overlayer. The second blocking underlayer and/or the second blocking overlayer exhibits a thickness of greater than 1 nm.

The combination of the increasing distribution in thickness of the metallic functional layers having properties of reflection in the infrared region and the concentration of the blocking layers in contact with the second functional layer makes it possible to obtain glazings having a very high selectivity exhibiting in particular an LT/g ratio of greater than 2, preferably greater than 2.2. By varying the thicknesses of the functional layers and of the blocking layers, the transparency of the glazing can be controlled so as to obtain LT values of the order of 50%, which range is very particularly suitable for the glazings intended to be used in regions subject to high exposure to sunlight. However, the major advantage of the invention is that the satisfactory performance in terms of solar protection does not take place to the detriment of the visual appearance of the substrate, which exhibits in particular esthetically acceptable colors in transmittance, in external reflection and in internal reflection as well as internal reflection values which are sufficiently low to limit mirror reflections.

Specifically, the substrate coated with the stack of layers according to the invention, used as monolithic glazing or incorporated in a multiple glazing of double glazing type, exhibits a pleasant and subdued coloration in internal reflection, in external reflection and in transmittance, within the range of the blues or blue-greens (values for dominant wavelength of the order of 470 to 500 nanometers). The term "color in the blue-green" should be understood as meaning, within the meaning of the present invention, that, in the L*a*b* color measurement system, a* is between −12 and −2, preferably between −10 and −4, and b* is between −12 and 2, preferably between −10 and 1.

Furthermore, this visual appearance remains virtually unchanged whatever the angle of incidence with which the glazing is observed (normal incidence and under an angle). This means that a spectator does not have the impression of a significant lack of uniformity in color or in appearance.

Throughout the description, the substrate according to the invention is regarded as positioned horizontally. The stack of thin layers is deposited above the substrate. The meaning of the expressions "above" and "below" and "lower" and "upper" is to be considered with respect to this orientation. Unless specifically stipulated, the expressions "above" and "below" do not necessarily mean that two layers and/or coatings are positioned in contact with one another. When it is specified that a layer is deposited "in contact" with another layer or with a coating, this means that there cannot be one (or more) layer(s) inserted between these two layers (or layer and coating).

Within the meaning of the present invention, the labels "first", "second", "third" and "fourth" for the functional layers or the antireflective coatings are defined starting from the substrate carrying the stack and with reference to the layers or coatings having the same function. For example, the functional layer closest to the substrate is the first functional layer, the next moving away from the substrate is the second functional layer, and the like.

The characteristic according to which the thicknesses of the metallic functional layers 40, 80, 120 increase starting from the substrate means that the thickness of the third metallic functional layer 120 is greater than that of the second metallic functional layer 80 and that the thickness of the second metallic functional layer is greater than that of the first metallic functional layer 40. The increase in thickness between two successive functional layers is, by order of increasing preference, greater than 2 nm, greater than 3 nm or greater than 4 nm.

Unless otherwise indicated, the thicknesses mentioned in the present document are physical or real thicknesses (and not optical thicknesses).

According to advantageous embodiments of the invention, the metallic functional layers satisfy one or more of the following conditions:
  the three metallic functional layers correspond to the first, the second and the third metallic functional layer defined starting from the substrate,
  the ratio of the thickness of a metallic functional layer to the thickness of the preceding one is greater than or equal to 1.10,
  the ratio of the thickness of the second metallic layer 80 to the thickness of the first metallic functional layer 40 is between 1.50 and 2.20, preferably between 1.80 and 2.20, including these values,
  the ratio of the thickness of the third metallic layer 120 to the thickness of the second metallic functional layer 80 is between 1.10 and 1.60, preferably 1.10 and 1.55, including these values,
  the thickness of each functional layer is between 6 and 26 nm, preferably between 6 and 24 nm, including these values,
  the thickness of the first metallic functional layer 40 is, by order of increasing preference, of from 7 to 12 nm, from 8 to 10 nm,
  the thickness of the second metallic functional layer 80 is, by order of increasing preference, of from 14 to 18 nm, from 15 to 17 nm,
  the thickness of the third metallic functional layer 120 is, by order of increasing preference, of from 18 to 24 nm, from 19 to 23 nm,
  the total thickness of the metallic functional layers 40, 80, 120 is between 30 and 60 nm, including these values, preferably between 40 and 50 nm.

The ratio of the mean of the thickness of the second and third metallic functional layers to the thickness of the first metallic functional layer is between 1.50 and 2.50, including these values. Observing these ratios contributes to a color in external reflection in the blue-green being obtained.

These ranges of thickness for the metallic functional layers are the ranges for which the best results are obtained for a light transmittance in a double glazing of approximately 50%, a low light reflection and a lower solar factor making it possible to obtain a high selectivity with, in addition, a color in reflection, both from the outside and from the inside, and also in neutral transmittance, in the blue-green range.

According to the invention, a blocking layer can be inserted between an or each antireflective coating and an adjacent functional layer. A blocking layer positioned under a functional layer in the direction of the substrate is referred to as blocking underlayer "UB". A blocking layer positioned on the functional layer on the opposite from the substrate is known as blocking overlayer "OB". The blocking layers conventionally have the role of protecting the functional layers from possible degradation during the deposition of the upper antireflective coating and during an optional high-temperature heat treatment, of the annealing, bending and/or tempering type.

As regards the blocking layers located in contact with a functional layer, the labels "first", "second" and "third" are defined starting from the substrate carrying the stack and with reference to the labels "first", "second" and "third" of the functional layer in contact with which the blocking layers are found. For example, the second functional layer can comprise one or two second blocking layers chosen from a second blocking underlayer and a second blocking overlayer.

The applicant has discovered, surprisingly, that the advantageous results of the substrate of the invention are obtained in particular by virtue of the combination of increasing thicknesses for the functional layers starting from the substrate and of the concentration in thickness of the blocking layer or layers around the second functional layer.

According to the invention, the thickness of the first blocking layer is understood to mean the sum of the thicknesses of the first blocking underlayer and of the first blocking overlayer, if both blocking layers are in contact with the first functional layer. Likewise, the thickness of the second blocking layer is understood to mean the sum of the thicknesses of the second blocking underlayer and of the second blocking overlayer, if both blocking layers are in contact with the second functional layer. Finally, the thickness of the third blocking layer is understood to mean the sum of the thicknesses of the third blocking underlayer and of the third blocking overlayer, if both blocking layers are in contact with the third functional layer.

The substrate according to the invention comprises at least one second blocking layer located in contact with the second metallic functional layer 80 and optionally at least one blocking layer chosen from:
- a first blocking layer located in contact with the first metallic functional layer 40,
- a third blocking layer located in contact with the third metallic functional layer 120, the first, second and/or third blocking layers respectively exhibiting thicknesses CB1, CB2 and CB3 satisfying the following equation: CB1+CB3<1.10 CB2 with at least the thickness CB2 nonzero.

The substrate according to the invention comprises at least one blocking layer chosen from:
- a first blocking underlayer UB1 located below and in contact with the first metallic functional layer 40,
- a first blocking overlayer OB1 located above and in contact with the first metallic functional layer 40,
- a second blocking underlayer UB2 located below and in contact with the second metallic functional layer 80,
- a second blocking overlayer OB2 located above and in contact with the second metallic functional layer 80,
- a third blocking underlayer UB3 located below and in contact with the third metallic functional layer 120,
- a third blocking overlayer OB3 located above and in contact with the third metallic functional layer 120, respectively exhibiting thicknesses UB1, OB1, UB2, OB2, UB3 and OB3 satisfying the following equation: (UB1+OB1)+(UB3+OB3)<1.10 (UB2+OB2), with at least the thickness UB2 or OB2 nonzero.

From the definition of the invention, the thicknesses CB1, UB1, OB1, CB3, UB3, OB3, CB2, UB2 and OB2 satisfy the following equations:
CB1 is equal to UB1+OB1,
CB3 is equal to UB3+OB3 and
CB2 is equal to UB2+OB2.

According to advantageous embodiments of the invention, the blocking layer or layers satisfy one or more of the following conditions:
- each metallic functional layer 40, 80, 120 is in contact with at least one blocking layer,
- each metallic functional layer 40, 80, 120 is in contact with a single blocking layer,
- the blocking layer or layers are located in contact with and above a metallic functional layer and correspond to blocking overlayers "OB",
- each metallic functional layer 40, 80, 120 is in contact with a blocking overlayer denoted, as a function of the position with respect to the substrate, first blocking overlayer, second blocking overlayer and third blocking overlayer,
- the blocking layer or layers are located in contact with and below a metallic functional layer and correspond to blocking underlayers "UB",
- each metallic functional layer 40, 80, 120 is in contact with a blocking underlayer denoted, as a function of the position with respect to the substrate, first, second and third blocking underlayer,
- the first, second and third blocking overlayers respectively exhibit thicknesses OB1, OB2 and OB3 satisfying the following equation: OB1+OB3<1.10 OB2,
- the first, second and third blocking underlayers respectively exhibit thicknesses UB1, UB2 and UB3 satisfying the following equation: UB1+UB3<1.10 UB2,
- the ratio of the thickness of the second blocking layer CB2 to the thickness of the first blocking layer CB1 is greater than 1.10, preferably of between 1.10 and 10 and better still of between 1.10 and 2.00, preferably between 1.40 and 1.70, including these values,
- the ratio of the thickness of the second blocking layer CB2 to the thickness of the third blocking layer CB3 is greater than 1.10, preferably of between 2.00 and 10, preferably between 2.90 and 3.20, including these values,
- the ratio of the thickness of the second blocking overlayer OB2 to the thickness of the first blocking overlayer OB1 is greater than 1.10, preferably of between 1.10 and 10.00 and better still of between 1.10 and 2.00, preferably between 1.40 and 1.70, including these values,
- the ratio of the thickness of the second blocking overlayer OB2 to the thickness of the third blocking overlayer OB3 is greater than 1.10, preferably of between 2.00 and 10.00, preferably between 2.90 and 3.20, including these values,
- the ratio of the thickness of the second blocking underlayer UB2 to the thickness of the first blocking underlayer UB1 is greater than 1.10, preferably of between 1.10 and 10.00 and better still of between 1.10 and 2.00, preferably between 1.40 and 1.70, including these values,
- the ratio of the thickness of the second blocking underlayer UB2 to the thickness of the third blocking underlayer UB3 is greater than 1.10, preferably of between 2.00 and 10, preferably between 2.90 and 3.20, including these values,
- the thickness of each blocking underlayer and overlayer is at least 0.5 nm, preferably at least 0.8 nm,
- the thickness of the first blocking layer CB1 is, by order of increasing preference, of from 1 to 2.5 nm, from 1.5 to 2 nm, the thickness of the first blocking overlayer OB1 50 is, by order of increasing preference, of from 1 to 2.5 nm, from 1.5 to 2 nm, the thickness of the first blocking underlayer UB1 is, by order of increasing preference, of from 1 to 2.5 nm, from 1.5 to 2 nm, the thickness of the second blocking layer CB2 is, by order of increasing preference, of from 1.5 to 3.5 nm, from 2 to 3 nm, the thickness of the second blocking overlayer OB2 90 is, by order of increasing preference, of from 1.5 to 3.5 nm, from 2 to 3 nm, the thickness of the second blocking underlayer UB2 is, by order of increasing preference, of from 1.5 to 3.5 nm, from 2 to 3 nm, the thickness of the third blocking layer CB3 is, by order of increasing preference, of from 0.5 to 1.5 nm, from 0.5 to 1 nm, the thickness of the third blocking overlayer OB3 130 is, by order of increasing preference, of from 0.5 to 1.5 nm, from 0.5 to 1 nm, the thickness of the third blocking underlayer UB3 is, by order of increasing preference, of from 0.5 to 1.5 nm, from 0.5 to 1 nm, the total thickness of the blocking layers 50, 90, 130 is of between 3 and 7 nm, including these values, preferably between 3.5 and 5 nm and better still 4 and 5 nm.

According to advantageous embodiments of the invention, the blocking layers are chosen from metals and metal alloys, nitrides and oxynitrides. The blocking layers are thus chosen from metallic layers based on a metal or on a metal alloy, metal nitride layers and metal oxynitride layers, preferably of one or more elements chosen from titanium, nickel, chromium and niobium, such as Ti, TiN, Nb, NbN, Ni, NiN, Cr, CrN, NiCr or NiCrN.

Although these blocking layers are deposited in the metallic, nitride or oxynitride form, it is obvious that these layers can be subjected to a partial or complete oxidation depending on their thickness, for example at the time of the deposition of the following layer.

According to advantageous embodiments of the invention, the antireflective coatings satisfy one or more of the following conditions:

the antireflective coatings corresponding to the first, to the second and to the third antireflective coating defined starting from the substrate have a substantially identical thickness, the antireflective coatings, preferably in the tempered stacks, corresponding to the first, to the second and to the third antireflective coating defined starting from the substrate exhibit a ratio of the thickness of a coating to the thickness of the preceding one which is of between 0.90 and 1.20, including these values, the thickness of the first antireflective coating 20 is, by order of increasing preference, of from 30 to 75 nm, from 40 to 70 nm, from 50 to 60 nm, the thickness of the second antireflective coating 60 is, by order of increasing preference, of from 40 to 80 nm, from 50 to 70 nm, from 60 to 65 nm, the thickness of the third dielectric coating 100 is, by order of increasing preference, of from 40 to 80 nm, from 50 to 70 nm, from 60 to 65 nm, the thickness of the fourth antireflective coating 140 is, by order of increasing preference, of from 15 to 40 nm, from 20 to 30 nm, the antireflective coatings comprise at least one dielectric layer based on oxide or on nitride of one or more elements chosen from silicon, aluminum, tin or zinc, at least one antireflective coating comprises at least one dielectric layer having a barrier function, each antireflective coating comprises at least one dielectric layer having a barrier function, the dielectric layers having a barrier function are preferably based on silicon compounds chosen from oxides, such as $SiO_2$, silicon nitrides $Si_3N_4$ and oxynitrides $SiO_xN_y$, optionally doped using at least one other element, such as aluminum, at least one antireflective coating comprises at least one dielectric layer having a stabilizing function, each antireflective coating comprises at least one dielectric layer having a stabilizing function, the dielectric layers having a stabilizing function are preferably based on crystalline oxide, in particular based on zinc oxide, optionally doped using at least one other element, such as aluminum, each functional layer is above an antireflective coating, the upper layer of which is a dielectric layer having a stabilizing function, preferably based on zinc oxide, and/or below an antireflective coating, the lower layer of which is a dielectric layer having a stabilizing function.

The antireflective coatings each located between two metallic functional layers, that is to say the second and third antireflective coatings, exhibit fairly similar optical thicknesses. Each antireflective coating located between two metallic functional layers comprises one or more dielectric layers.

Preferably, each antireflective coating is composed solely of one or more dielectric layers. Preferably, there is thus no absorbent layer in the antireflective coatings in order not to decrease the light transmittance.

The stacks of the invention can comprise dielectric layers having a barrier function.

The term "dielectric layers having a barrier function" is understood to mean a layer made of a material capable of forming a barrier to the diffusion of oxygen and water at high temperature, originating from the ambient atmosphere or from the transparent substrate, toward the functional layer. The constituent materials of the dielectric layer having a barrier function thus must not undergo chemical or structural modification at high temperature which would result in a modification to their optical properties. The layer or layers having a barrier function are preferably also chosen in a material capable of forming a barrier to the constituent material of the functional layer. The dielectric layers having a barrier function thus allow the stack to be subjected, without excessively significant optical change, to heat treatments of the annealing, tempering or bending type.

The dielectric layers having a barrier function are preferably based on silicon compounds chosen from oxides, such as $SiO_2$, silicon nitrides $Si_3N_4$ and oxynitrides $SiO_xN_y$, optionally doped using at least one other element, such as aluminum. The dielectric layers having a barrier function can also be based on aluminum nitrides AlN. The presence of the dielectric layers having a barrier function is particularly advantageous for thin layer stacks to be bent/tempered.

The stacks of the invention can comprise dielectric layers having a stabilizing function. Within the meaning of the invention, "stabilizing" means that the nature of the layer is selected so as to stabilize the interface between the functional layer and this layer. This stabilization results in the reinforcing of the adhesion of the functional layer to the layers which surround it and thus it will oppose the migration of its constituent material.

The dielectric layer having a stabilizing function is preferably based on oxide chosen from zinc oxide, tin oxide, zirconium oxide or a mixture of at least two of them. The dielectric layer or layers having a stabilizing function are preferably layers of zinc oxide.

The final layer of each antireflective coating underlying a functional layer 40, 80, 120 is a dielectric layer having a stabilizing function 28, 68, 108. This is because it is advantageous to have a layer having a stabilizing function, for example based on zinc oxide, below a functional layer as it facilitates the adhesion and the crystallization of the silver-based functional layer and increases its quality and its stability at high temperature.

It is also advantageous to have a layer having a stabilizing function, for example based on zinc oxide, above a functional layer in order to increase the adhesion thereof and to optimally oppose the diffusion from the side of the stack opposite the substrate.

The dielectric layer or layers having a stabilizing function can thus be found above and/or below at least one functional layer or each functional layer, either directly in contact with it or separated by a blocking layer. Preferably, each functional layer is above a coating, the upper layer of which is a dielectric layer having a stabilizing function, preferably based on zinc oxide, and/or below a coating, the lower layer of which is a dielectric layer having a stabilizing function, preferably based on zinc oxide.

Advantageously, each dielectric layer having a barrier function is separated from a functional layer by at least one dielectric layer having a stabilizing function.

This dielectric layer having a stabilizing function can have a thickness of at least 5 nm, in particular a thickness of between 5 and 25 nm and better still from 8 to 15 nm.

A particularly advantageous embodiment relates to a substrate comprising a stack, defined starting from the transparent substrate, comprising:
- a first antireflective coating comprising at least one dielectric layer having a barrier function and at least one dielectric layer having a stabilizing function,
- a first functional layer,
- a first blocking layer,
- a second antireflective coating comprising at least one lower dielectric layer having a stabilizing function, a dielectric layer having a barrier function and at least one upper dielectric layer having a stabilizing function,
- a second functional layer,
- a second blocking layer,
- a third antireflective coating comprising at least one lower dielectric layer having a stabilizing function, a dielectric layer having a barrier function and at least one upper dielectric layer having a stabilizing function,
- a third functional layer,
- a third blocking layer,
- a fourth antireflective coating comprising at least one dielectric layer having a stabilizing function and at least one dielectric layer having a barrier function.

The invention also relates to a glazing comprising a transparent substrate as defined above. Said glazing can be in the form of a laminated glazing, of an asymmetrical glazing or of a multiple glazing of the double glazing type.

According to advantageous embodiments, the glazing according to the invention exhibits a light transmittance LT of 45% to 55% and/or a selectivity of at least 2.1 and preferably of at least 2.2.

The transparent substrates according to the invention are preferably made of a rigid inorganic material, such as glass, or are chosen from polymeric substrates, such as substrates made of polyethylene terephthalate PET, of polyethylene naphthalate PEN and of polycarbonate.

The glazing according to the invention can exhibit a laminated structure. In this case, the substrate comprises at least two rigid substrates of the glass type assembled by at least one sheet of thermoplastic polymer, in order to exhibit a structure of glass/stack of thin layers/sheet(s)/glass type. The polymer can in particular be based on polyvinyl butyral PVB, ethylene/vinyl acetate EVA, polyethylene terephthalate PET or polyvinyl chloride PVC. The glazing can then exhibit a structure of the following type: glass/stack of thin layers/sheet(s) of polymer/glass. In a laminated structure, the substrate carrying the stack can be in contact with the polymer sheet.

The glazing can also be a multiple glazing, in particular a double glazing. In a double glazing structure, the stack can be on face 2, when the incident direction of the sunlight is regarded as passing through the faces in the increasing order of their number. It is preferable in a multiple glazing configuration for the stack to be positioned so as to face the inserted gas-filled cavity.

The glazing can also be a triple glazing composed of three glass sheets separated in pairs by a gas-filled cavity. In a triple glazing structure, the substrate carrying the stack can be on face 2 and/or on face 5, when the incident direction of the sunlight is regarded as passing through the faces in the increasing order of their number.

The invention relates in addition to the use of the substrate according to the invention in order:
- to produce a glazing having a high energy reflection and/or
- to produce a glazing having a very low emissivity and/or
- to produce a heating glazing with a transparent coating which heats by the Joule effect,
- to produce a transparent electrode of an electrochromic glazing or of a lighting device or of a display device or of a photovoltaic panel.

The stack according to the invention makes it possible to obtain a tempered or nontempered substrate which is coated with a stack and which exhibits, once fitted into double glazing:
- a light transmittance of approximately 50%,
- a low external light reflection,
- a low solar factor and a high selectivity, in particular greater than 2.2,
- a color in external reflection with is not very pronounced (with a* and b* values in the Lab system of between −12 and 2) and which in addition varies little as a function of the angle of observation,
- an internal reflection which is low and with blue-green colors.

The glazing can be bent and/or tempered while being composed of a single substrate, that equipped with the stack. It is then a "monolithic" glazing. In the case where they are bent, in particular for the purpose of forming glazings for vehicles, the stack of thin layers is preferably found on an at least partially nonplanar face.

The glazing can also be a multiple glazing, in particular a double glazing, it being possible for at least the substrate carrying the stack to be bent and/or tempered. It is preferable, in a multiple glazing configuration, for the stack to be positioned so as to face the inserted gas-filled cavity. In a laminated structure, the substrate carrying the stack can be in contact with the polymer sheet.

The advantageous characteristics and details of the invention emerge from the following nonlimiting examples, illustrated using the appended figures:

FIG. 2 illustrates the colorimetric change as a function of the variation in the thickness of the blocking overlayers in transmittance (2.a), in external reflection (2.b) and in internal reflection (2.c), FIG. 3 illustrates the colorimetric change as a function of the variation in the thickness of the blocking underlayers in transmittance (3.a), in external reflection (3.b) and in internal reflection (3.c).

The proportions between the various components are not observed in order to make the figures easier to read.

Figure 1:
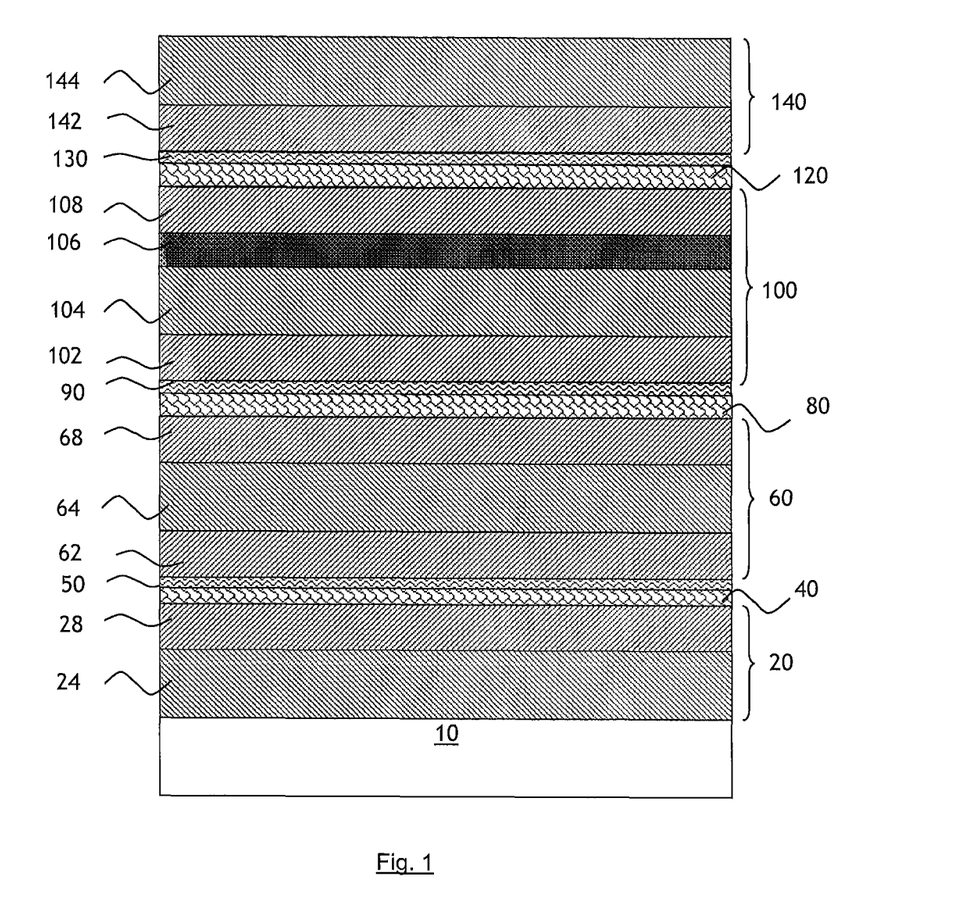
FIG. 1 illustrates an example of the structure of a stack having three metallic functional layers according to the invention.

FIG. 1 illustrates a stack structure having three metallic functional layers 40, 80, 120, this structure being deposited on a transparent glass substrate 10. Each functional layer 40, 80, 120 is positioned between two antireflective coatings 20, 60, 100, 140 so that:

- the first functional layer 40 starting from the substrate is positioned between the antireflective coatings 20, 60,
- the second functional layer 80 is positioned between the antireflective coatings 60, 100 and
- the third functional layer 120 is positioned between the antireflective coatings 100, 140.

These antireflective coatings 20, 60, 100, 140 each comprise at least one dielectric antireflective layer 24, 28; 62, 64, 68; 102, 104, 106, 108; 142, 144.

Each functional layer 40, 80, 120 can be deposited on a blocking or underblocking coating positioned between the antireflective coating underlying the functional layer and the functional layer.

Each functional layer 40, 80, 120, 160 can be deposited directly under a blocking or overblocking coating 50, 90, 130 positioned between the functional layer and the antireflective coating overlying this layer.

EXAMPLES

I. Preparation of the Substrates: Stacks, Deposition Conditions and Heat Treatments Stacks, defined below, of thin layers are deposited on substrates made of clear soda-lime glass with a thickness of 6 mm, distributed by Saint-Gobain.

For these examples, the conditions for deposition of the layers, which were deposited by sputtering ("magnetron cathode" sputtering), are summarized in table 1.

TABLE 1

| | Target employed | Deposition pressure | Gas | Index 550 nm |
|---|---|---|---|---|
| $Si_3N_4$ | Si:Al at 92.8% by weight | $3.2 \times 10^{-3}$ mbar | $Ar/(Ar + N_2)$ at 55% | 2.03 |
| ZnO | Zn:Al at 98.2% by weight | $1.8 \times 10^{-3}$ mbar | $Ar/(Ar + O_2)$ at 63% | 1.95 |
| SnZnO | Sn (15% at.):Zn (85% at.) | $3-5 \times 10^{-3}$ mbar | $Ar/(Ar + O_2)$ at 75% | 2.03 |
| NiCr | Ni (80% at.):Cr (20% at.) | $2-3 \times 10^{-3}$ mbar | Ar at 100% | — |
| Ag | Ag | $3 \times 10^{-3}$ mbar | Ar at 100% | — | at. = atomic

Table 2 lists the materials and the physical thicknesses in nanometers (unless otherwise indicated) for each layer or coating making up the stacks as a function of their positions with respect to the substrate carrying the stack (final line at the bottom of the table). The "Ref." numbers correspond to the references of FIG. 1.

The substrates C.1, C.2, C.3, C.4 and Inv.AT were subjected to a heat tempering under the following conditions: heat treatment for 5 to 10 minutes at a temperature of between 600 and 750° C.

The substrate Inv.BT was not subjected to a heat treatment.

TABLE 2

| | Ref. | C. 1 | C. 2 | C. 3 | C. 4 | Inv. AT | Inv. BT |
|---|---|---|---|---|---|---|---|
| Antireflective coating AR4 | 140 | 26 | 26 | 31 | 28 | 26 | 24 |
| $Si_3N_4$ | 144 | 20 | 20 | 25 | 22 | 20 | 18 |
| ZnO | 142 | 6 | 6 | 6 | 6 | 6 | 6 |
| NiCr blocking layer OB3 | 130 | 0.2 | 0.6 | 1 | 0.9 | 0.8 | 0.4 |
| Functional layer Ag3 | 120 | 22.3 | 19.7 | 20.3 | 19.5 | 20.7 | 22 |
| Antireflective coating AR3 | 100 | 62 | 61 | 67 | 75 | 62 | 61 |
| ZnO | 108 | 6 | 6 | 6 | 6 | 6 | 6 |
| SnZnO | 106 | 15 | 15 | 15 | 15 | 15 | 15 |
| $Si_3N_4$ | 104 | 35 | 34 | 40 | 48 | 35 | 34 |
| ZnO | 102 | 6 | 6 | 6 | 6 | 6 | 6 |
| NiCr blocking layer OB2 | 90 | 0.3 | 0.4 | 0.4 | 0.8 | 2.5 | 2.8 |
| Functional layer Ag2 | 80 | 17.1 | 18.1 | 18.3 | 17.6 | 16.3 | 14.8 |
| Antireflective coating AR2 | 60 | 62 | 61 | 65 | 60 | 63 | 59 |
| ZnO | 68 | 6 | 6 | 6 | 6 | 6 | 6 |
| $Si_3N_4$ | 64 | 50 | 49 | 53 | 48 | 51 | 47 |
| ZnO | 62 | 6 | 6 | 6 | 6 | 6 | 6 |
| NiCr blocking layer OB1 | 50 | 0.2 | 1.2 | 1.4 | 2 | 1.6 | 0.4 |
| Functional layer Ag1 | 40 | 11.5 | 10.5 | 8.5 | 8 | 8.5 | 9.6 |
| Antireflective coating AR1 | 20 | 30 | 36 | 50 | 52 | 56 | 32 |
| ZnO | 28 | 6 | 6 | 6 | 6 | 6 | 6 |
| $Si_3N_4$ | 24 | 24 | 30 | 44 | 46 | 50 | 26 |
| Glass substrate (mm) | 10 | 6 | 6 | 6 | 6 | 6 | 6 |

Each antireflective coating 20, 60, 100 underlying a functional layer 40, 80, 120 comprises a final stabilizing layer 28, 68, 108 based on crystalline zinc oxide which is in contact with the functional layer 40, 80, 120 deposited immediately above.

Each antireflective coating 20, 60, 100, 140 comprises a dielectric layer having a barrier function 24, 64, 104, 144 based on silicon nitride doped with aluminum, referred to here as $Si_3N_4$ for reasons of simplicity, although the true nature of the layer is in fact $Si_3N_4$:Al, as explained above.

These layers based on silicon nitride are important in order to obtain the barrier effect to oxygen.

The following table 3 summarizes the characteristics related to the thicknesses of the functional layers, of the antireflective coatings and of the blocking layers.

TABLE 3

| | C. 1 | C. 2 | C. 3 | C. 4 | Inv. 1AT | Inv. 1BT |
|---|---|---|---|---|---|---|
| Ratio thicknesses functional layers | | | | | | |
| Ag2/Ag1 | 1.49 | 1.72 | 2.15 | 2.20 | 1.92 | 1.54 |
| Ag3/Ag2 | 1.30 | 1.09 | 1.11 | 1.11 | 1.27 | 1.49 |
| Ag3/Ag1 | 1.94 | 1.88 | 2.39 | 2.44 | 2.44 | 2.29 |

TABLE 3-continued

|  | C. 1 | C. 2 | C. 3 | C. 4 | Inv. 1AT | Inv. 1BT |
|---|---|---|---|---|---|---|
| Σ thicknesses of the functional layers |  |  |  |  |  |  |
| (Ag1 + Ag2 + Ag3) | 50.90 | 48.30 | 47.10 | 45.10 | 45.5 | 46.4 |
| Ratio thicknesses antireflective coatings |  |  |  |  |  |  |
| AR2/AR1 | 2.07 | 1.69 | 1.30 | 1.15 | 1.13 | 1.84 |
| AR3/AR2 | 1.00 | 1.00 | 1.03 | 1.25 | 0.98 | 1.03 |
| AR4/AR3 | 0.42 | 0.43 | 0.46 | 0.37 | 0.42 | 0.39 |
| Ratio thicknesses blocking layers |  |  |  |  |  |  |
| OB2/OB1 | 1.50 | 0.33 | 0.29 | 0.40 | 1.56 | 7.00 |
| OB2/OB3 | 1.50 | 0.67 | 0.40 | 0.89 | 3.13 | 7.00 |
| OB1/OB3 | 1.00 | 2.00 | 1.40 | 2.22 | 2.00 | 1.00 |
| Σ thicknesses OB1 + OB2 + OB3 | 0.70 | 2.20 | 2.80 | 3.70 | 4.90 | 3.60 |
| A = OB1 + OB3 | 0.40 | 1.80 | 2.40 | 2.90 | 2.40 | 0.80 |
| B = 1.10 * OB2 | 0.33 | 0.44 | 0.44 | 0.88 | 2.75 | 3.08 |
| A < B | No | No | No | No | Yes | Yes |

II. "Solar Control" and Colorimetry Performances

Table 4 lists the main optical characteristics measured for the substrates incorporated in a double glazing having the structure: 6-mm glass/16-mm inserted space filled with 90% argon/4-mm glass, the stack being positioned on face 2 (face 1 of the glazing being the outermost face of the glazing, as normal).

For these double glazings:
LT indicates: the light transmittance in the visible region in %, measured according to the illuminant D65 at 10° Observer;
a*T and b*T indicate the a* and b* colors in transmittance in the LAB system measured according to the illuminant D65 at 10° Observer and measured perpendicularly to the glazing;
LRext indicates: the light reflection in the visible region in %, measured according to the illuminant D65 at 10° Observer on the side of the outermost face, face 1;
a*Rext and b*Rext indicate the a* and b* colors in reflection in the LAB system measured according to the illuminant D65 at 10° Observer on the side of the outermost face and thus measured perpendicularly to the glazing;
LRint indicates: the light reflection in the visible region in %, measured according to the illuminant D65 at 10° Observer on the side of the innermost face, face 4;
a*Rint and b*Rint indicate the a* and b* colors in reflection in the LAB system measured according to the illuminant D65 at 10° Observer on the side of the innermost face and thus measured perpendicularly to the glazing.

TABLE 4

|  | C. 1 | C. 2 | C. 3 | C. 4 | Inv. 1AT | Inv. 1BT |
|---|---|---|---|---|---|---|
| Energy factors |  |  |  |  |  |  |
| g | 23.00 | 22.80 | 22.90 | 22.60 | 22.70 | 22.30 |
| s | 2.18 | 2.16 | 2.21 | 2.20 | 2.22 | 2.22 |
| Color in transmittance |  |  |  |  |  |  |
| LT % | 50.2 | 49.2 | 50.6 | 49.7 | 50.5 | 49.7 |
| a*T | −4.2 | −4.8 | −5.6 | −5.4 | −8.4 | −7.2 |
| b*T | 4.1 | −0.3 | 1.9 | 2.4 | 0.2 | 0.6 |

TABLE 4-continued

|  | C. 1 | C. 2 | C. 3 | C. 4 | Inv. 1AT | Inv. 1BT |
|---|---|---|---|---|---|---|
| Color in reflection |  |  |  |  |  |  |
| LRext % | 23.7 | 19.6 | 17.8 | 17.1 | 17.1 | 18.1 |
| a*Rext | −5.1 | −4.2 | −6.5 | −5.8 | −6.3 | −6.5 |
| b*Rext | −9.4 | −7.4 | −8.6 | −9.6 | −8.9 | −8.6 |
| LRint % | 30.5 | 26.3 | 23.7 | 23.2 | 20.3 | 20.6 |
| a*Rint | −10.3 | −17.4 | −19.7 | −17.1 | −7.7 | −7.1 |
| b*Rint | −2.5 | −1.7 | −3.7 | −3.6 | −7.1 | −7.1 |

According to the invention, it is possible to produce a glazing comprising a stack having three metallic functional layers which exhibits a low light reflection, a highly advantageous selectivity (LT/g ratio) of the order of 2.2, and also an excellent compromise for the colors in internal and external reflection and in transmittance, insofar as all the a* and b* values are between −9 and 1.

The advantageous properties relating to the internal reflection make it possible, when it is dark outside illuminated premises equipped with glazings of the invention, to see these colored glazings in a pleasant manner and to prevent mirror effects.

The glazings according to the invention thus offer good solar protection within a range of light transmittances which is particularly suitable for equipping buildings experiencing high exposure to sunlight.

The combination of the increasing metallic functional layers and the use of one or more thick blocking layers around the second metallic functional layer contribute to these better results being obtained: low light reflection and lower solar factor, in order to be able to obtain a high selectivity with a color in reflection, both from the outside and from the inside, which is neutral, in the blue-green range.

Figure 2:
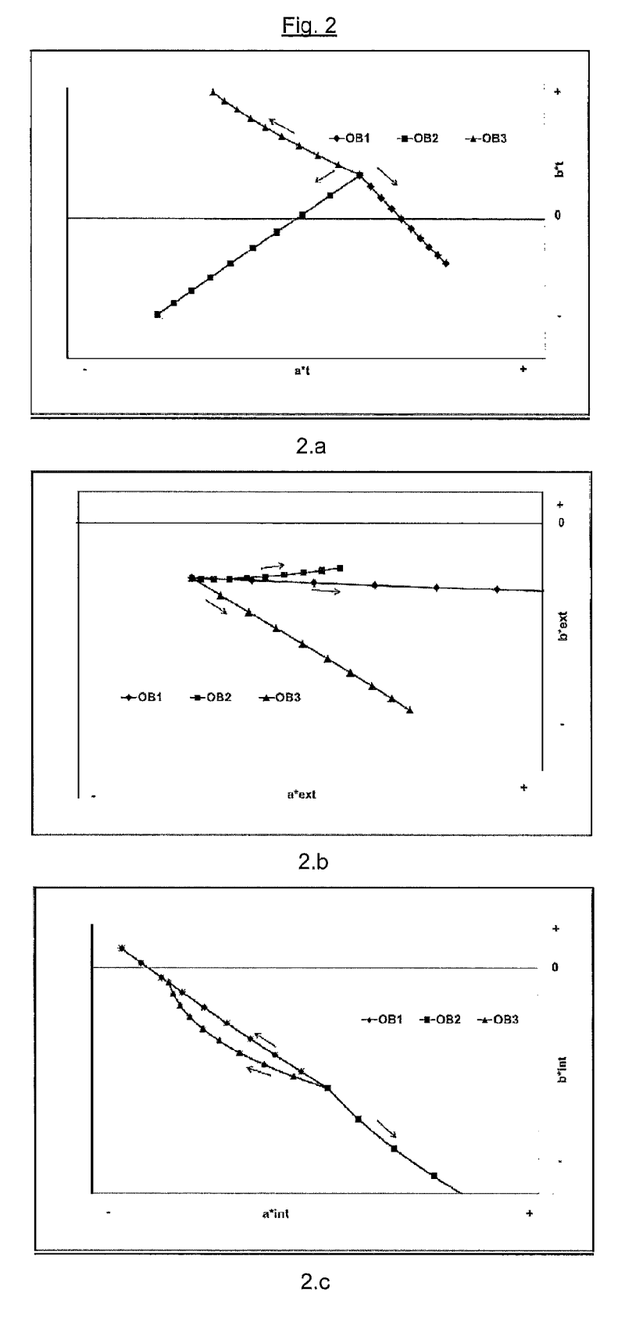

III. Influence of the Presence and of the Thickness of the Blocking Layers Concentrated Around the Second Functional Layer FIGS. 2.a, 2.b and 2.c illustrate the trend of the colorimetric change according to the variation in the thickness of the blocking overlayers respectively in transmittance, in external reflection and in internal reflection.

Figure 3:
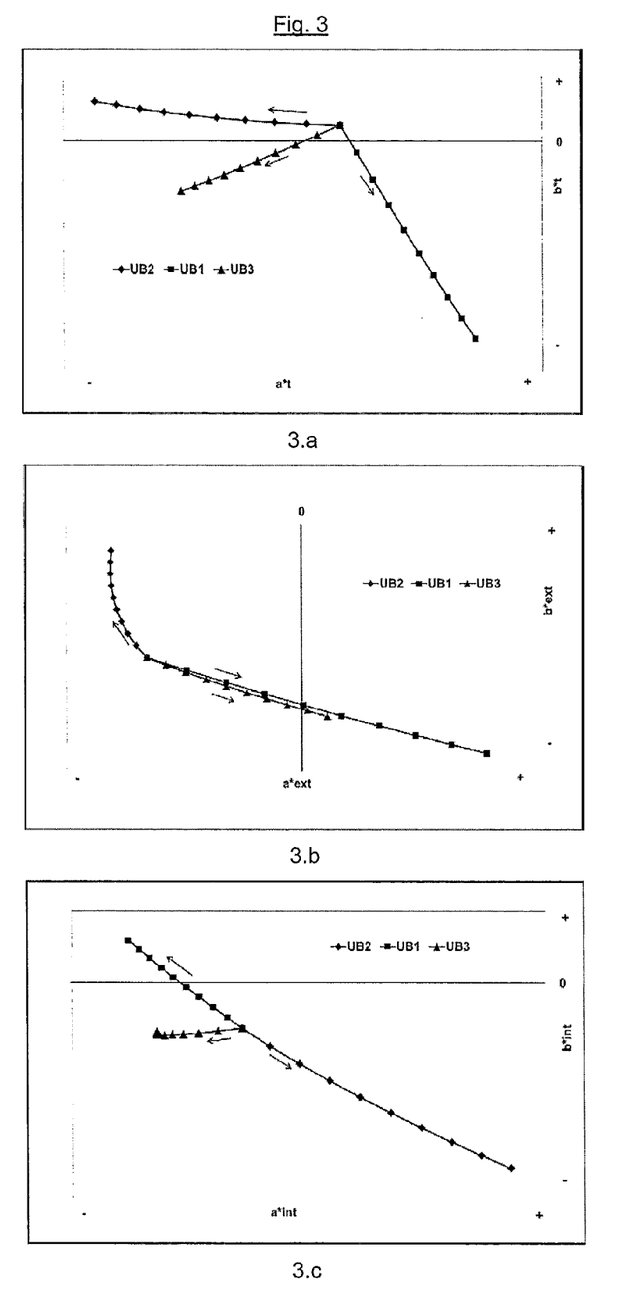

FIGS. 3.a, 3.b and 3.c illustrate the trend of the colorimetric change according to the variation in the thickness of the blocking underlayers respectively in transmittance, in external reflection and in internal reflection.

The arrows represent the direction of the increasing increase in the thicknesses of the blocking overlayers and underlayers.

Starting from a reference substrate comprising three blocking overlayers (OB1, OB2, OB3) respectively located above each of the three functional layers, the following were varied:
the thickness OB1 of the first blocking overlayer located above the first functional layer (keeping unchanged all the other thicknesses of the stack, including OB2 and OB3),
the thickness OB2 of the second blocking overlayer located above the second functional layer (keeping unchanged all the other thicknesses of the stack, including OB1 and OB3),
the thickness OB3 of the third blocking layer located above the third functional layer (keeping unchanged all the other thicknesses of the stack, including OB1 and OB2).

Starting from a reference substrate comprising three blocking underlayers (UB1, UB2, UB3) respectively located below each of the three functional layers, the following were varied:

the thickness UB1 of the first blocking underlayer located above the first functional layer (keeping unchanged all the other thicknesses of the stack, including UB2 and UB3), the thickness UB2 of the second blocking underlayer located above the second functional layer (keeping unchanged all the other thicknesses of the stack, including UB1 and UB3), the thickness UB3 of the third blocking underlayer located above the third functional layer (keeping unchanged all the other thicknesses of the stack, including UB1 and UB2).

The comparative examples C.1 to C.4 exhibit a* values in internal reflection which are too low and in particular less than −10 (see table 4).

In point of fact, the analysis of the colorimetric curves and more particularly of the curves 2.c and 3.c shows that only the increase in thickness of the second blocking layer located above or above the second functional layer makes it possible to increase the a* values.

Consequently, the concentration of the blocking layers in contact with the second functional layer makes it possible to obtain internal reflection properties which are advantageous in terms of colorimetry.

Furthermore, surprisingly, a lower internal light reflection LR is also obtained.

Finally, satisfactory colors in internal reflection are obtained without harming the color in transmittance and in external reflection, which is entirely unforeseeable. Specifically, the a* and b* values are all of between −9 and 1.

In point of fact, FIGS. 2.a, 2.b and 3.a, 3.b, which illustrate the trend of the colorimetric change according to the variation in the thickness of the blocking underlayers and overlayers in transmittance and in external reflection, give absolutely no suggestion of the excellent compromise obtained according to the invention in terms of color in transmittance, in internal reflection and in external reflection, of light reflection and of solar control performance.

The invention claimed is:

1. A transparent substrate comprising a stack of thin layers successively comprising, starting from the substrate, an alternation of three metallic functional layers, and of four antireflective coatings, each antireflective coating comprising at least one dielectric layer, so that each metallic functional layer is positioned between two antireflective coatings, the three metallic functional layers including starting from the substrate a first metallic functional layer, a second metallic functional layer and a third metallic functional layer, wherein:

the thicknesses of the metallic functional layers, starting from the substrate, increase as a function of the distance from the substrate, and wherein, the second metallic functional layer is directly in contact with at least one second blocking layer, chosen from a second blocking underlayer and a second blocking overlayer, the second blocking underlayer and/or the second blocking overlayer exhibits a thickness of greater than 1 nm, said stack including the at least one second blocking layer being devoid of a blocking layer directly in contact with the first and/or the third metallic functional layer, and the at least one second blocking layer is chosen from metallic layers based on a metal or on a metal alloy, metal nitride layers and metal oxynitride layers, or wherein, the second metallic functional layer is directly in contact with the at least one second blocking layer, chosen from the second blocking underlayer and the second blocking overlayer, the second blocking underlayer and/or the second blocking overlayer exhibits a thickness of greater than 1 nm, and the stack further comprises at least one blocking layer chosen from a first blocking layer located in contact with the first metallic functional layer and a third blocking layer located in contact with the third metallic functional layer, the first, second and/or third blocking layers respectively exhibit thicknesses CB1, CB2, CB3 satisfying the following equation: CB1+CB3<1.1 CB2, with at least the thickness CB2 nonzero, wherein the first, second and third blocking layers are chosen from metallic layers based on a metal or on a metal alloy, metal nitride layers and metal oxynitride layers.

2. The substrate as claimed in claim 1, wherein each metallic functional layer is in contact with at least one blocking layer.

3. The substrate as claimed in claim 1, wherein each metallic functional layer is in contact with a blocking overlayer.

4. The substrate as claimed in claim 1, wherein the first, the second and the third blocking layer satisfy the following characteristics:

a ratio of the thickness of the second blocking layer CB2 to the thickness of the first blocking layer CB1 is greater than 1.10, a ratio of the thickness of the second blocking layer CB2 to the thickness of the third blocking layer CB3 is greater than 1.10.

5. The substrate as claimed in claim 4, wherein the ratio of the thickness of the second blocking layer CB2 to the thickness of the first blocking layer CB1 is from 1.10 to 10, and the ratio of the thickness of the second blocking layer CB2 to the thickness of the third blocking layer CB3 is from 2.00 to 10.

6. The substrate as claimed in claim 5, wherein the ratio of the thickness of the second blocking layer CB2 to the thickness of the first blocking layer CB1 is from 1.10 to 2, and the ratio of the thickness of the second blocking layer CB2 to the thickness of the third blocking layer CB3 is from 2.90 to 3.2.

7. The substrate as claimed in claim 1, wherein the first, second and third blocking layers are chosen from Ti, TiN, Nb, NbN, Ni, NiN, Cr, CrN, NiCr or NiCrN layers.

8. The substrate as claimed in claim 1, wherein the thickness of the second blocking layer CB2 is of from 1.5 to 3.5 nm.

9. The substrate as claimed in claim 1, wherein a total thickness of the first, second and third blocking layers is from 3 to 7 nm.

10. The substrate as claimed in claim 9, wherein the total thickness of the first, second and third blocking layers is from 3.5 to 5 nm.

11. The substrate as claimed in claim 1, wherein the first, the second and the third metallic functional layer satisfy the following characteristics:

a ratio of the thickness of the second metallic layer to the thickness of the first metallic functional layer is from 1.50 to 2.20, a ratio of the thickness of the third metallic layer to the thickness of the second metallic functional layer is from 1.10 to 1.60.

12. The substrate as claimed in claim 11, wherein the ratio of the thickness of the second metallic layer to the thickness of the first metallic functional layer is from 1.80 to 2.20, and the ratio of the thickness of the third metallic layer to the thickness of the second metallic functional layer is from 1.10 to 1.55.

13. The substrate as claimed in claim 1, wherein the antireflective coatings corresponding to a first, to a second and to a third antireflective coating defined starting from the substrate exhibit a ratio of a thickness of a coating to the thickness of the preceding one which is from 0.90 to 1.20.

14. The substrate as claimed in claim 1, wherein the antireflective coatings comprise at least one dielectric layer based on oxide or on nitride of one or more elements chosen from silicon, aluminum, tin or zinc.

15. The substrate as claimed in claim 1, wherein each of the antireflective coatings comprises at least one dielectric layer having a barrier function based on silicon compounds chosen from silicon oxides $SiO_2$, silicon nitrides $Si_3N_4$ and oxynitrides $SiO_xN_y$, optionally doped using at least one other element.

16. The substrate as claimed in claim 1, wherein each of the antireflective coatings comprises at least one dielectric layer having a stabilizing function based on zinc oxide; optionally doped using at least one other element.

17. The substrate as claimed in claim 1, comprising a stack, defined starting from the transparent substrate, comprising:

a first antireflective coating comprising at least one dielectric layer having a barrier function and at least one dielectric layer having a stabilizing function,
a first functional layer,
a first blocking layer,
a second antireflective coating comprising at least one lower dielectric layer having a stabilizing function, a dielectric layer having a barrier function and at least one upper dielectric layer having a stabilizing function,
a second functional layer,
a second blocking layer,
a third antireflective coating comprising at least one lower dielectric layer having a stabilizing function, a dielectric layer having a barrier function and at least one upper dielectric layer having a stabilizing function,
a third functional layer,
a third blocking layer,
a fourth antireflective coating comprising at least one dielectric layer having a stabilizing function and at least one dielectric layer having a barrier function.

18. A glazing comprising a transparent substrate as claimed in claim 1, wherein the glazing is in the form of a laminated glazing, of an asymmetrical glazing or of a multiple glazing of the double glazing type.

19. The substrate as claimed in claim 1, wherein the metallic layers, the metal nitride layers and the metal oxynitride layers include one or more elements chosen from titanium, nickel, chromium and niobium.

* * * * *